(12) United States Patent  (10) Patent No.: US 6,477,322 B1
Crowhurst  (45) Date of Patent: Nov. 5, 2002

(54) PORTABLE HUMIDIFIER

(76) Inventor: Paul Crowhurst, 44 Hyde Park, Beaconsfield, Quebec (CA), H9W 5L8

( * ) Notice: Subject to any disclaimer, the term of this patent is extended or adjusted under 35 U.S.C. 154(b) by 0 days.

(21) Appl. No.: 09/760,739

(22) Filed: Jan. 17, 2001

(30) Foreign Application Priority Data

Jan. 17, 2000 (CA) .............................................. 2296154

(51) Int. Cl.⁷ .......................... A01H 33/00; B01D 1/00
(52) U.S. Cl. ...................................... 392/405; 392/394
(58) Field of Search ................................ 392/386, 394, 392/400, 401, 402, 403, 404, 405, 406; 261/142, 72.1, 72.2, DIG. 48, DIG. 55, DIG. 65

(56) References Cited

U.S. PATENT DOCUMENTS

| | | | | |
|---|---|---|---|---|
| 4,663,091 A | * | 5/1987 | Seo ........................... | 261/72.1 |
| 4,719,057 A | * | 1/1988 | Mizoguchi ................... | 261/81 |
| 4,810,854 A | * | 3/1989 | Jurisch et al. .............. | 392/405 |
| 5,010,905 A | * | 4/1991 | Snyder et al. ............... | 132/272 |
| 5,073,967 A | * | 12/1991 | Marino ........................ | 392/406 |
| 5,247,604 A | * | 9/1993 | Chiu .......................... | 239/135 |
| 5,339,383 A | * | 8/1994 | Marino ........................ | 261/142 |
| 5,361,322 A | * | 11/1994 | Glucksman .................. | 392/405 |
| 5,464,572 A | * | 11/1995 | Bonzi .......................... | 261/30 |
| 5,832,176 A | * | 11/1998 | Jung .......................... | 392/391 |
| 5,859,952 A | * | 1/1999 | Levine et al. ............ | 239/102.1 |

* cited by examiner

Primary Examiner—Sang Paik
(74) Attorney, Agent, or Firm—Ogilvy Renault

(57) ABSTRACT

An electric warm-air humidifier consisting of a base, a boiler tray supported on the base, a heating element, a liquid supply supported on the base and having a discharge opening communicating with the boiler tray and adapted to maintain a given level of liquid therein and a vapor chimney supported on the base having a receiving end communicating with the boiler tray so as to receive vapor therefrom and a discharge end for discharging the vapor received from the boiler tray. Also included is an electrical supply for supplying electrical energy to the heating element and a switch mounted on the heating element and adapted to deactivate the electrical supply in response to separating movement between the vapor passage and the base assembly.

9 Claims, 6 Drawing Sheets

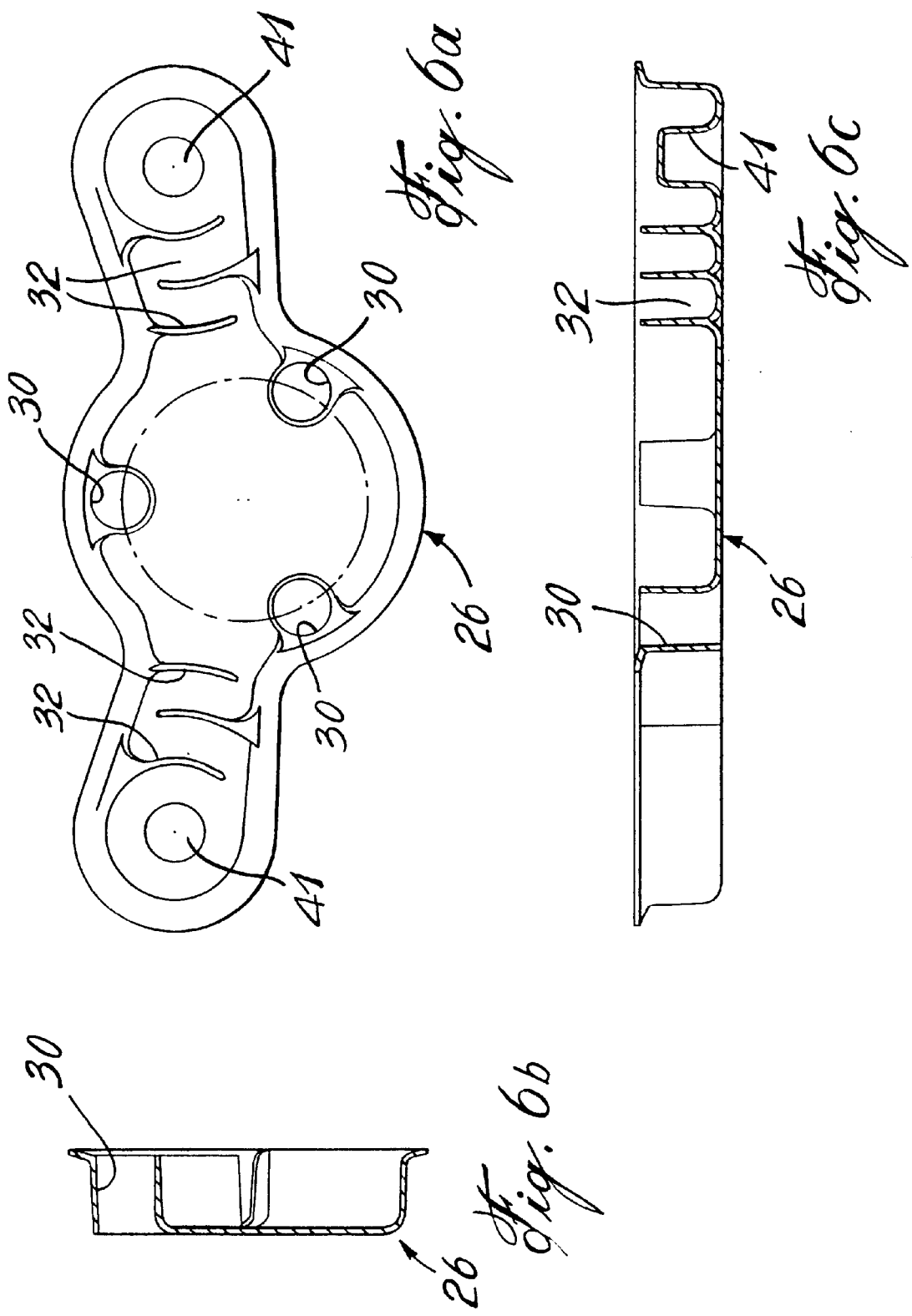

PORTABLE HUMIDIFIER

BACKGROUND OF THE INVENTION

1. Field of the Invention

The present invention relates to humidifiers, and more particularly to a blowerless warm-air humidifier.

2. Description of the Prior Art

One of the problems with portable humidifiers, which include a vapor chamber in the form of a chimney, a boiler tray, an electrical supply connected to a heating element in the boiler tray, and water reservoirs, is the ability to thoroughly clean the elements of the humidifier.

Portable humidifiers are generally modular and the various parts can easily be disassembled and reassembled for operation. However there are still too many areas of the components that cannot be properly cleaned and are subject of mineral deposits and bacteria built up.

Attempts have been made to overcome certain of these problems. U.S. Pat. No. 5,339,383 Marino 1994 discloses a humidifier with electrical components located about the lower pan in which the water is heated. An electrical interlocks allows access to the interior only after the electrical power has been unplugged. U.S. Pat. No. 5,014,338 Glucksman issued in 1991 as well as U.S. Pat. No. 5,111,529 also to Glucksman issued in 1992 show motor driven blowers in a portable air humidifier where the water tray is removable for cleaning.

However in any of these patents it has still been found difficult to access areas for cleaning, such as the vapor chamber, etc.

SUMMARY OF THE INVENTION

It is an aim of the present invention to provide a portable humidifier which is made of separable components which can be easily disassembled and assembled for cleaning purposes.

The invention is a humidifier including a base, a boiling tray removably mounted to the base which incorporates a heating element, a liquid supply means supported on the base and having a discharge opening communicating with the boiling tray and adapted to maintain a given level of liquid therein, a vapor passage supported on the base and having a receiving end communicating with the boiling tray and a discharge end for discharging the vapor received from the cavity. Also included is an electrical supply for supplying electrical energy to the heater and a switch mounted on the heating element and adapted to deactivate the electrical power to the heater in response to a separating movement between the vapor passage and the base assembly.

When electrical power is supplied to the heating element the water in the boiling tray rapidly reaches the boiling temperature and begins to vaporize. As this vapor rises in the vapor passage, air is drawn through the air inlet, through the plenum formed beneath the boiling tray and upward through the chimneys formed in the boiling tray. This cool room air mixes with the vapor in the vapor passage thus lowering the temperature of the discharges air/vapor mixture to a safe and comfortable level.

The humidifier of this invention has advantages over prior art warm-air humidifiers for a number of reasons:

i) Compared with other warm-air humidifiers which use a motor driven fan to provide air mixing, the humidifier described herein is quieter, simpler and less costly to manufacture.

ii) Compared with units which mount the heating element in a removable evaporation chamber, the humidifier described herein is simpler in construction and easier to clean. Humidifiers of this type have only the bottom surface of the heating element accessible and since all of the electrical parts are enclosed in the same evaporation housing, care must be taken to prevent water entering the electrical housing during cleaning. The boiling chamber described herein is completely removable from the base to facilitate cleaning.

iii) Compared with units which mount the boiling tray (sealed to the base) and electrical supply in the base, the humidifier described herein is easier to clean and safer since water leaks in the above mentioned units can cause electrical shorts and associated damage. All electrical connections in the humidifier described herein are above the water level of the tray and the overflow level of the base.

An element of this invention is the boiling tray which incorporates through holes in its construction to facilitate the air mixing which results in safe discharge vapor temperatures. The boiling tray can be constructed in a variety of ways to facilitate ease of removal and ease of cleaning.

a) The boiling tray can be constructed of stamped sheet metal, (e.g. stainless steel), with the heating element mounted in close thermal contact. Moreover the surface of the boiling tray can be coated with a non-stick material to further facilitate removal of mineral deposits which accumulate with use.

b) The boiler tray can be constructed of injection molded plastic. In this alternative configuration the plug-in heating element is immersed in the water contained in the tray.

BRIEF DESCRIPTION OF THE DRAWINGS

Having thus generally described the nature of the invention, reference will now be made to the accompanying drawings, showing by way of illustration, a preferred embodiment thereof, and in which:

FIG. 6a is a top plan view of the boiling tray of the present embodiment;

FIG. 6b is a vertical cross-section taken along lines b—b of FIG. 6a; and

FIG. 6c is a vertical cross-section taken along lines a—a of FIG. 6a.

DESCRIPTION OF THE PREFERRED EMBODIMENTS

Figure 1:
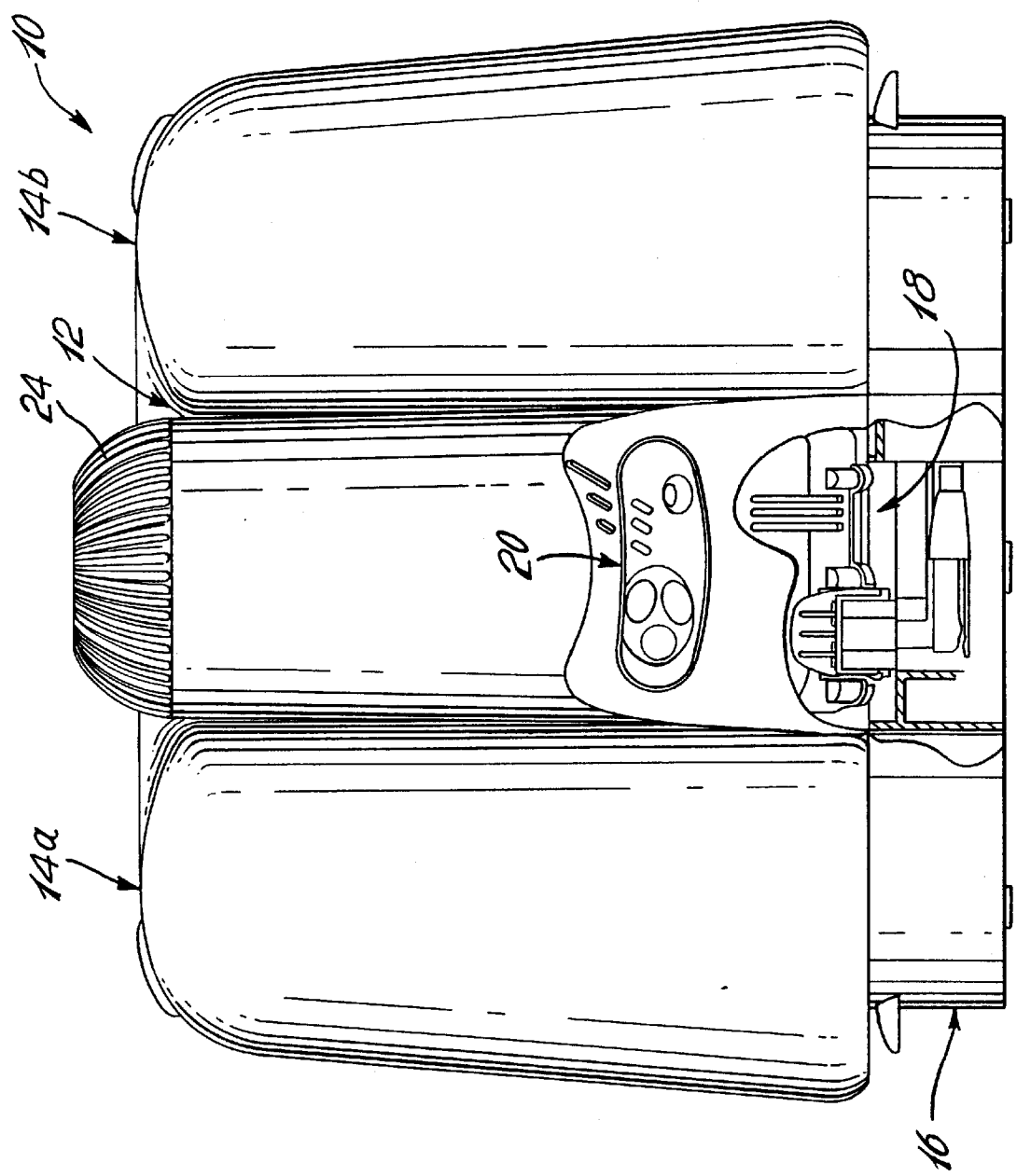
FIG. 1 is a front elevation partly cut away showing an embodiment of the present invention.
Figure 2:
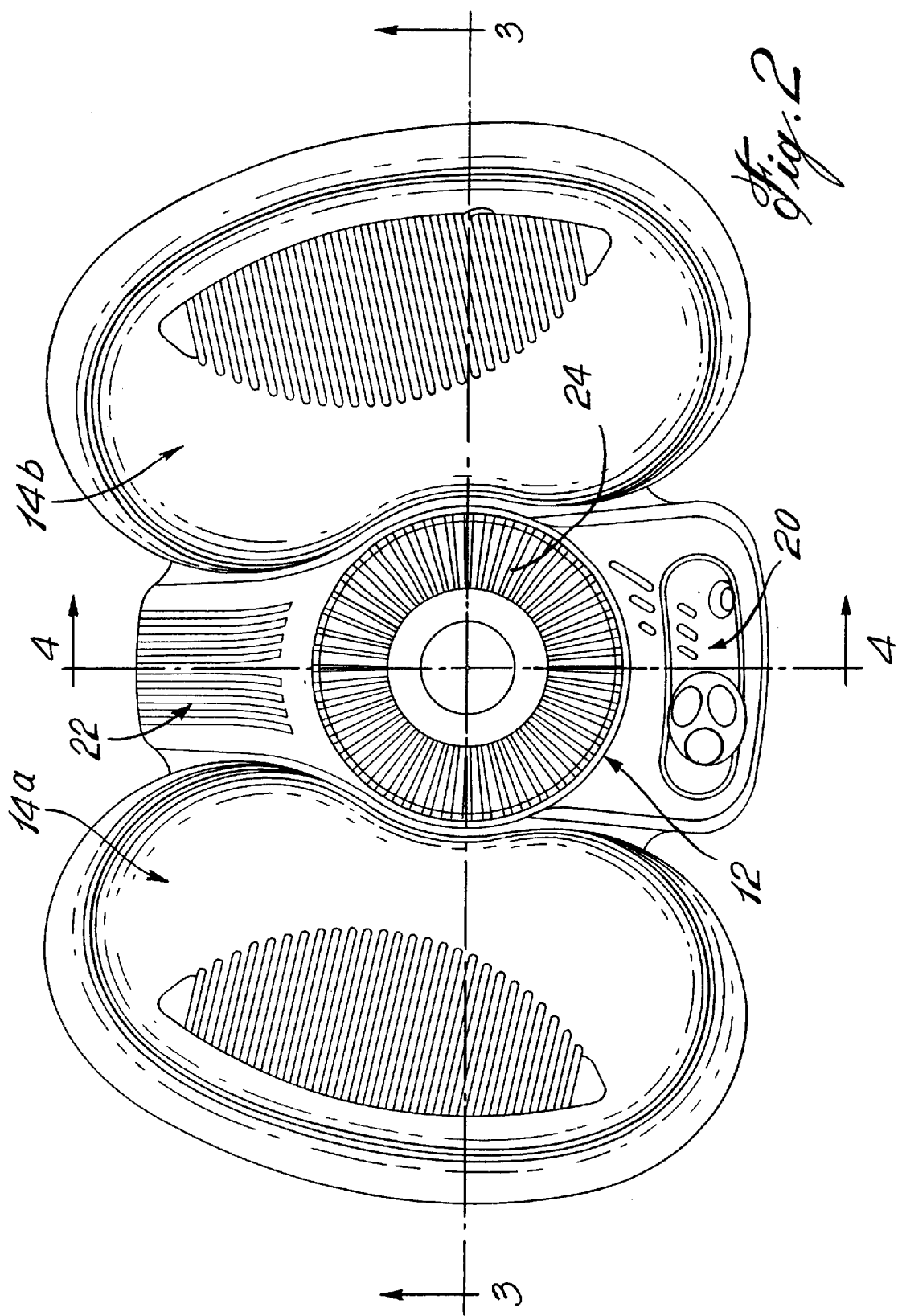
FIG. 2 is a top plan view of the embodiment shown in FIG. 1.
Figure 3:
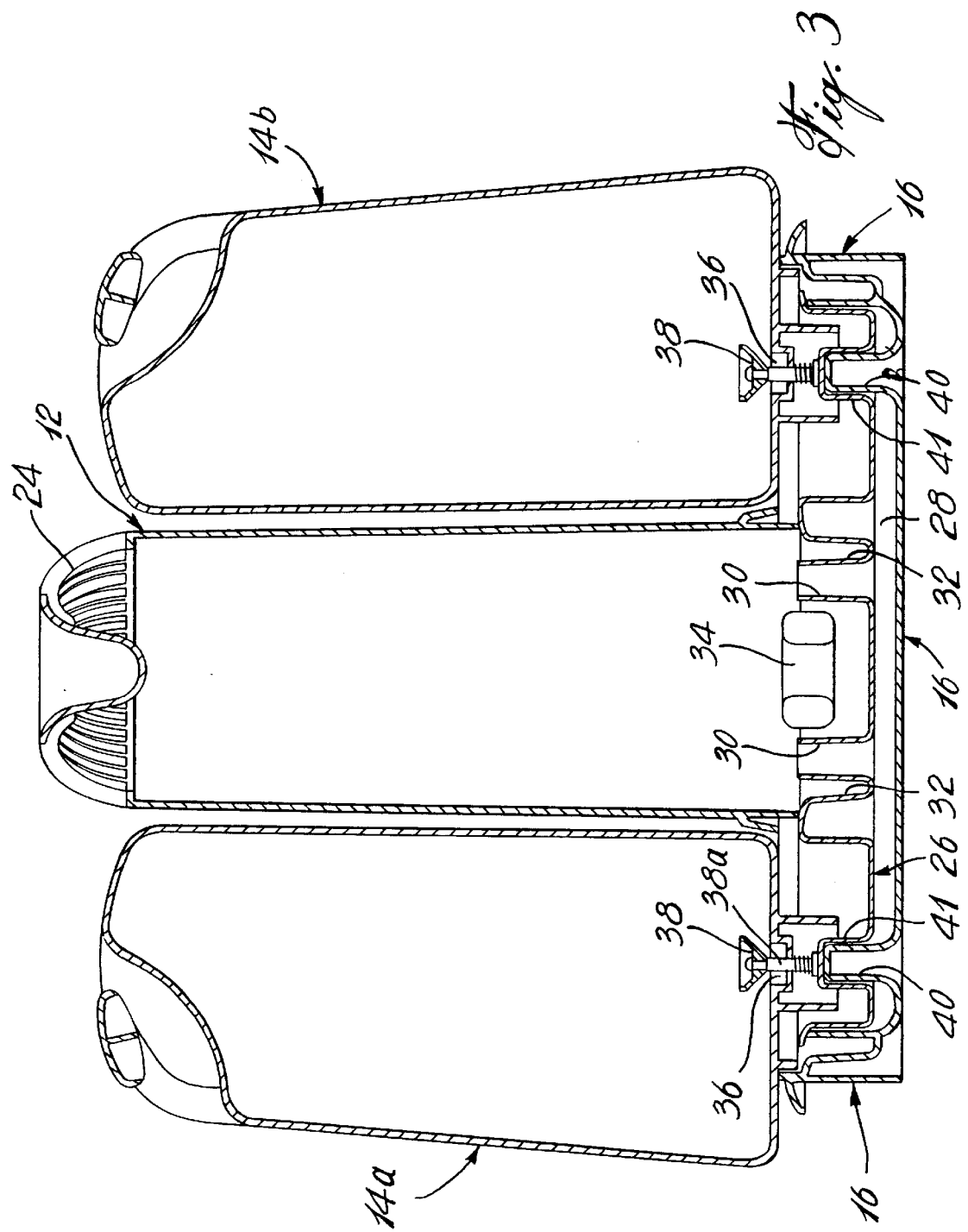
FIG. 3 is a vertical cross-section taken through lines 3—3 of FIG. 2.

Referring now to the drawings, particularly of FIGS. 1 to 3, the humidifier includes a vapor chamber housing or chimney 12 sitting on a base 16 which also supports a pair of water reservoirs 14a and 14b. The chimney 12 and water reservoirs 14a and 14b are easily removed from the base 16 by lifting these elements from the base. An electrical supply unit 18 as best shown in FIG. 4 is separate from the base 16 and the chimney 12 but is seated within the housings forming the base 16 and the chimney 12.

The base 16, as shown in FIGS. 1, 3, 4, and 5a, can be made as a one-piece molded plastic item having a bottom wall 16a, a peripheral wall 16b following the configuration of the base 16, a front compartment 16c for storing the electrical power supply 16d, and a power supply wire 16e. The floor 16a is molded to provide a seat for the boiling tray 26, which will be described later, and to define an air plenum 28 defined between the bottom wall 16a and the boiling tray 26.

A boiling tray 26 is seated within the base 16 and is easily removed therefrom. The boiling tray 26, as shown in FIGS. 6a through 6c, includes a central portion 27 in which the heating element 34 will be suspended The boiling tray 26 has a bottom wall 26a and a peripheral upstanding wall 26b which is continuous and follows the configuration of the boiling tray 26. Air chimneys in the form of pipes 30 are defined around the central portion 27 located in the tray, and water channels 32 are designed in the tray to allow a longer path for the water coming from the reservoirs 14a and 14b to arrive in the area of the heating element 34. This reduces the transfer of heat by means of the water to the reservoirs 14a and 14b

Figure 4:
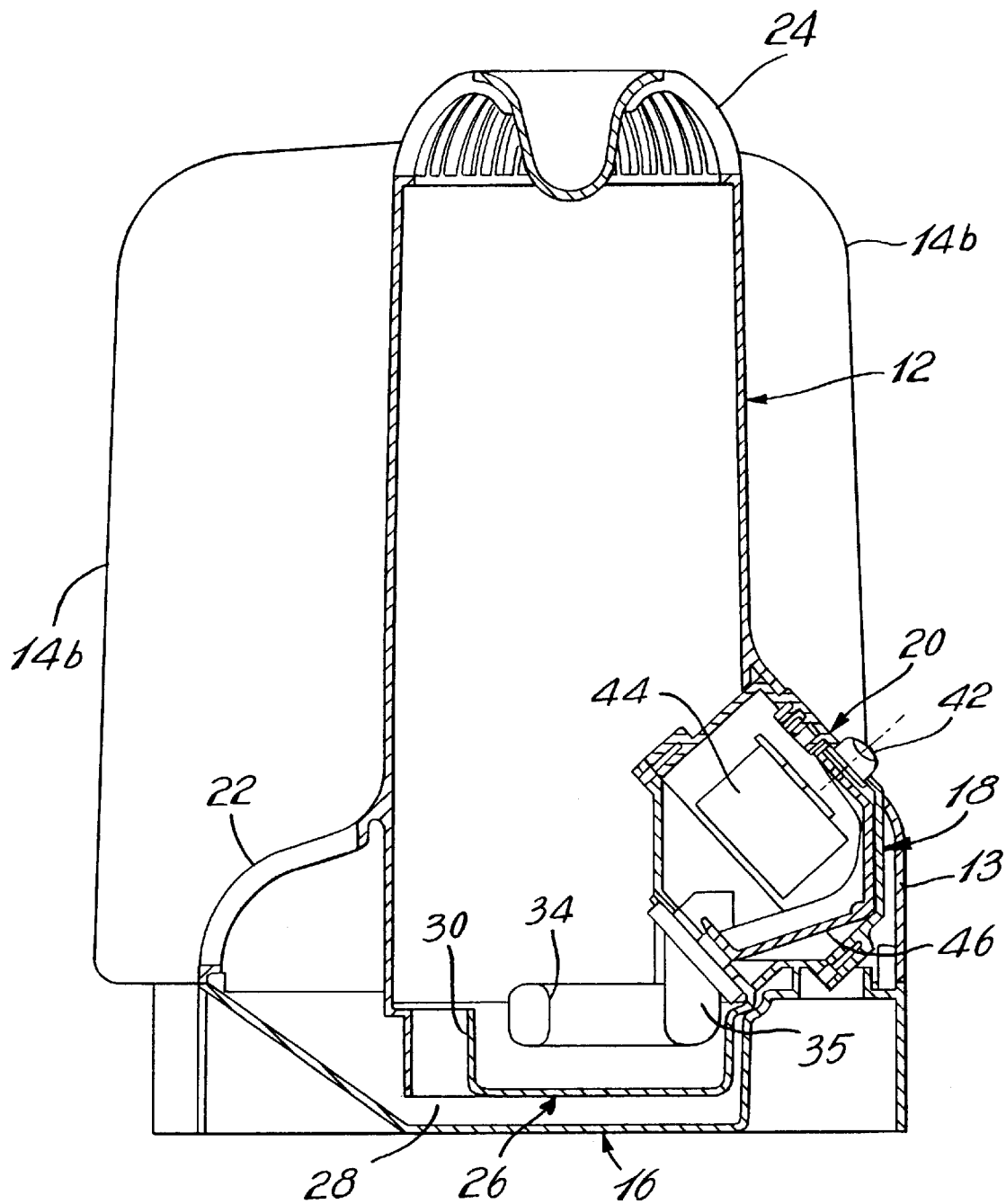
FIG. 4 is a vertical cross-section taken along lines 4—4 of FIG. 2.

As shown in FIGS. 3 and 4, the tray 26 is seated on the base 16 and defines an air plenum 28 between the bottom wall 26a of the tray 26 and the base 16. Thus, when the tray 26 is seated on the base 16, air will be drawn in through the air inlet opening 22 (FIG. 4) and then pass upwardly through the air pipes 30 into the chimney 12 to be mixed with the water vapor generated in the boiling tray 26.

By heating the water in the boiling tray 26 close to boiling, the evaporation of the water will be accelerated as it is heated, and the vapors so formed will rise in the chimney 12 towards the outlet 24. Without a fan, the hot water vapor rising in the chimney would increase the temperature of the surface of the chimney housing 12 to unbearable levels, making it too hot to touch. The provision of the pipes 30 in the boiling tray 26, aligned with the chimney 12, allows cooling air in the plenum 28 to rise with the vapors and cool off the vapors. Thus, the ambient temperature of the water vapor mixed with air coming out of the opening 24 is considerably reduced even without the use of a fan.

As shown in FIG. 3, the reservoirs are provided with valves 38 normally closing the water outlet 36. When the reservoirs 14a and 14b are seated on the base 16, the projection 40 of base 16 and the corresponding projection 41 of the tray 26 engage the plunger 38a against the spring to open the water outlet 36 to allow the water to flow into the tray 26.

The chimney 12 is well illustrated in FIGS. 1 to 5a. It is an open-ended tubular member where the open end can sit on the base 16. The tubular wall 12a defines the vapor chamber and is aligned vertically with the pipes 30 in the tray 26. The rear portion of the chimney 12 defines an opening 22 which permits fresh ambient air to enter into the base 16 and utimately the plenum 28. The front of the chimney 12 includes a cut-out window 22a exposing the electrical control panel 20.

The electrical control panel 20, on the electrical supply unit 18, projects through an opening in the housing 13 of the chimney 12. The housing 13 of the chimney 12 also defines an air inlet opening 22 in the rear side of the humidifier, as best shown in FIGS. 2 and 4. The housing of the chimney 12 defines an air outlet 24 at the very top thereof.

As can be seen from FIGS. 3 and 4, the water reservoirs 14a and 14b are easily removed from the base 16. The chimney 12 can also be easily lifted from the base 16 exposing the electrical supply unit 18 and the tray 26. Since the bottom of the chimney 12 is open, it can be easily cleaned.

The heating element 34 is electrically connected to the electrical supply unit 18 by means of connector 35. A reset switch 48 on the end of a link arm 48a, as shown in FIG. 5a, can be provided to disconnect the corrent to the heating element 34.

Figure 5A:
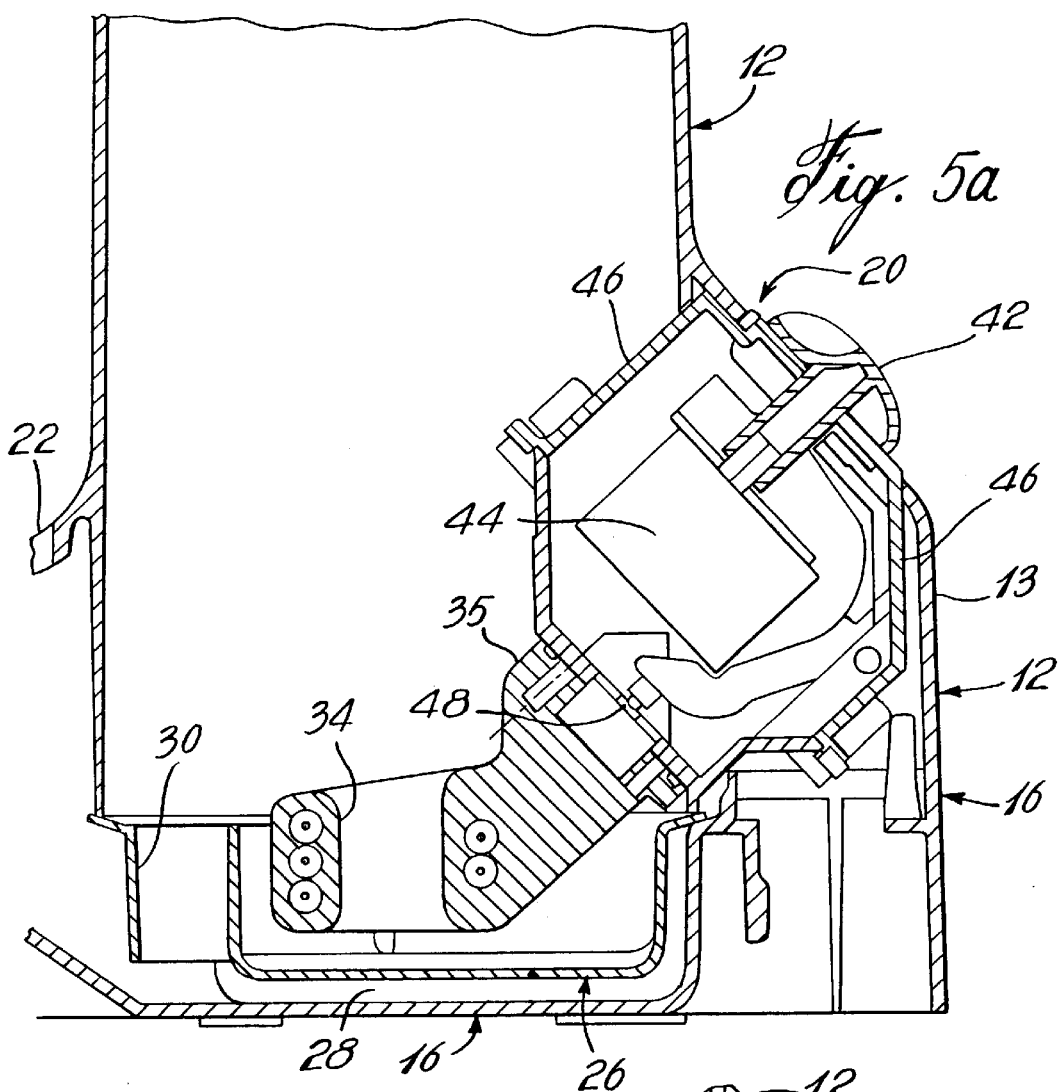
FIGS. 5a, 5b, and 5c are fragmentary enlarged vertical cross-sections of different portions of the electrical connectors.
Figure 5B:
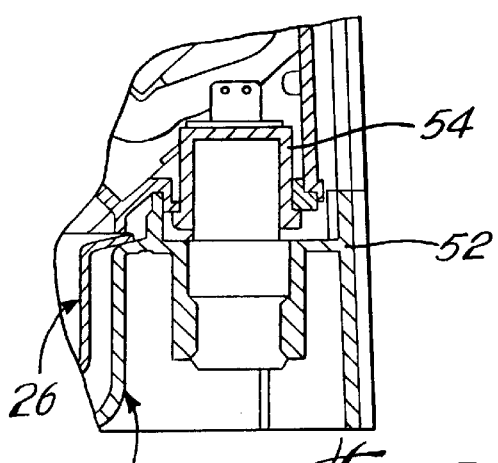
Figure 5C:
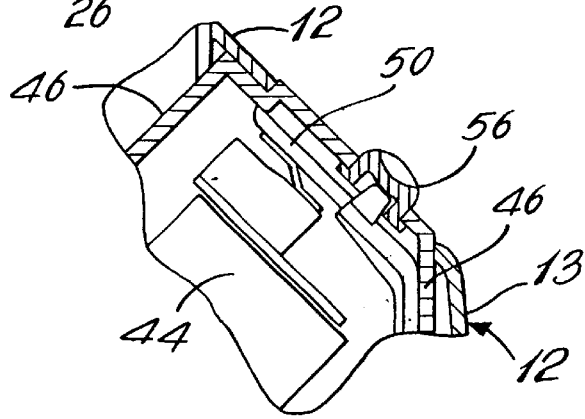

Referring now to FIGS. 5a to 5c, the electrical supply unit 18 includes a sealed housing 46. A humidistat 44 is mounted within the housing 46 and is controlled by a control knob 42 mounted on the control panel 20. FIG. 5b shows the sealed electrical connection which includes an electrical male connector 52 in the base 16 and a female electrical socket 54 formed in the housing 46 of the electrical supply unit 18. Thus, the electrical supply unit 18 can be removed from the base 16 using a conventional prong and socket connection.

A microswitch 50 may be provided to disconnect the electrical current when the chimney 12 is removed from the unit.

A reset button 56 is provided on the control panel 20.

Thus, in summary, the various elements forming the humidifier 10 are modular and can all be removed allowing proper cleaning. The chimney 12 is easily lifted from the base 16 as are the water reservoirs 14a and 14b. In fact for filling purposes the reservoirs 14a and 14b can be individually removed without affecting the operation of the humidifier. The electrical supply unit 18 can then be removed once the chimney 12 is removed and the heating element 34 connected to the electrical unit will be lifted from the boiling tray 26. Finally the boiling tray 26 can be easily lifted out of the base 16 for purposes of cleaning both the boiling tray 26 and the interior of the base 16.

The elements may be reassembled in reverse order.

As shown in FIG. 3, the reservoirs are provided with valves 38 normally closing the water outlet 36. When the reservoirs 14a or 14b are seated on the base 16, the projection 40 of the base 16 and the corresponding projection 41 of the tray 26 engage the plunger 38a against the spring to open the water outlet 36 to allow the water to flow into the tray 26.

The chimney 12 is well illustrated in FIGS. 1 to 5a. It is an open-ended tubular member where the open end can sit on the base 16. The tubular wall 12a defines the vapor chamber and is aligned vertically with the pipes 30 in the tray 26. The rear portion of the chimney 12 defines an opening 22 which permits fresh ambient air to enter into the base 16 and ultimately the plenum 28. The front of the chimney 12 includes a cut-out window 22a exposing the electrical control panel 20.

The electrical control panel 20, on the electrical supply unit 18, projects through an opening in the housing 13 of the chimney 12. The housing 13 of the chimney 12 also defines an air inlet opening 22 in the rear side of the humidifier, as best shown in FIGS. 2 and 4. The housing of the chimney 12 defines an air outlet 24 at the very top thereof.

As can be seen from FIGS. 3 and 4, the water reservoirs 14a and 14b are easily removed from tile base 16. The chimney 12 can also be easily lifted from the base 16 exposing the electrical supply unit 18 and the tray 26. Since the bottom of the chimney 12 is open, it can be easily cleaned.

The heating element 34 is electrically connected to the electrical supply unit 18 by means of connector 35. A reset switch 48 on the end of a link arm 48a, as shown in FIG. 5a, can be provided to disconnect the current to the heating element 34.

Referring now to FIGS. 5a to 5c, the electrical supply unit 18 includes a sealed housing 46. A humidistat 44 is mounted within the housing 46 and is controlled by a control knob 42 mounted on the control panel 20. FIG. 5b shows the sealed electrical connection which includes an electrical male connector 52 in the base 16 and a female electrical socket 54 formed in the housing 46 of the electrical supply unit 18. Thus, the electrical supply unit 18 can be removed from the base 16 using a conventional prong and socket connection.

A microswitch 50 may be provided to disconnect the electrical current when the chimney 12 is removed from the unit.

I claim:

1. A fanless air humidifier comprising a base, a boiling tray adapted to be seated in the base defining an air passage between the boiling tray and the base, and a water supply for feeding water to the boiling tray, the boiling tray comprising a bottom wall and a peripheral wall extending from the bottom wall a predetermined height, a vapor chamber housing having an open top end forming a chimney column directly above the boiling tray, an electrical heating element being seated above and partially within the boiling tray, said boiling tray comprising tubular pipes extending from the bottom wall and communicating with the air passage wherein the tubular pipes extend at least the height of the peripheral wall of the boiling tray and the pipes are aligned with the vapor chamber to communicate air directly from the air passage to the vapor chamber such that water is heated in the boiling tray to evaporate into the vapor chamber where it is mixed with ambient air passing through the pipes and induced to flow through the chimney.

2. The fanless air humidifier as defined in claim 1, wherein the chimney is readily separable from the base and is seated on the base over the boiling tray.

3. The fanless air humidifier as defined in claim 2, wherein the boiling tray is readily separable from the base and sits on the base.

4. The fanless air humidifier as defined in claim 3, wherein at least a self-contained water reservoir separable from the base sits on the base with means to communicate water in the reservoir to the boiling tray.

5. The fanless air humidifier as defined in claim 1, wherein a power supply is provided in the base and the electrical heating element is electrically connectable to the power supply in the base and is separable from the base and the power supply and sits on the base.

6. The fanless air humidifier as defined in claim 5, wherein the electrical heating element forms part of an assembly containing a control panel and humidisat, and when the humidifier is assembled, the assembly is located within the chimney, and a window is provided in a chimney wall to display the panel, the assembly being separable from the chimney and from the base.

7. A warm air humidifier comprising a base, a separable boiling tray seated on the base, a vapor chamber housing having an open top end and separable from the base and seated on the base over the boiling tray, an electrical heating element being seated on and separable from the base, the heating element being located within the vapor chamber but separable from the vapor chamber housing, the heating element extending over and partially within the boiling tray, a power supply provided in the base and the electrical heating element being electrically connectable and separable from the power supply in the base, and the electrical heating element being located within the chimney.

8. The warm air humidifier as defined in claim 7, wherein at least a separate self-contained water reservoir is adapted to be seated on the base and in water communication with the boiling tray.

9. The warm air humidifier as defined in claim 7, wherein the electrical heating element forms part of an assembly including a control panel and a humidistat, and the assembly is seated within the chimney and a window is defined in a wall of the chimney to display the control panel while the assembly is separable from the base and from the chimney.

* * * * *